(12) United States Patent
Koller et al.

(10) Patent No.: US 9,705,857 B1
(45) Date of Patent: Jul. 11, 2017

(54) SECURELY OUTPUTTING A SECURITY KEY STORED IN A UE

(71) Applicant: Sprint Spectrum L.P., Overland Park, KS (US)

(72) Inventors: Gary Koller, Overland Park, KS (US); Mark Peden, Olathe, KS (US); Raymond Reeves, Oviedo, FL (US); Simon Youngs, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 92 days.

(21) Appl. No.: 14/511,401

(22) Filed: Oct. 10, 2014

(51) Int. Cl.
*G06F 7/04* (2006.01)
*H04L 29/06* (2006.01)
*H04W 12/04* (2009.01)

(52) U.S. Cl.
CPC .......... *H04L 63/062* (2013.01); *H04W 12/04* (2013.01)

(58) Field of Classification Search
CPC ............ G06F 21/30; G06F 21/44; H04L 9/08
USPC ........................... 726/4–5; 713/171; 455/411
See application file for complete search history.

(56) References Cited

U.S. PATENT DOCUMENTS

| | | | | |
|---|---|---|---|---|
| 6,393,270 B1* | 5/2002 | Austin | ................. | H04W 8/265 380/247 |
| 7,707,412 B2* | 4/2010 | Nyberg | ............... | H04L 63/0869 713/168 |
| 8,064,880 B2* | 11/2011 | Jain | ........................ | H04W 12/06 370/328 |
| 8,935,769 B2* | 1/2015 | Hessler | ............... | H04L 63/0869 713/171 |
| 9,104,889 B1* | 8/2015 | Kiswani | ............. | G06F 21/6218 |
| 2006/0087999 A1* | 4/2006 | Gustave | ............. | H04L 63/0853 370/328 |
| 2009/0172403 A1* | 7/2009 | Liang | .................... | H04L 63/062 713/171 |
| 2010/0250921 A1* | 9/2010 | Spencer | ............... | H04L 9/3273 713/155 |
| 2011/0268274 A1* | 11/2011 | Qiu | ........................ | H04L 9/0844 380/270 |
| 2011/0268284 A1* | 11/2011 | Arimoto | ............. | G10H 1/0008 381/56 |
| 2012/0023567 A1* | 1/2012 | Hammad | ............... | G06Q 20/12 726/9 |

(Continued)

OTHER PUBLICATIONS

Michael D. Gallagher and Randall A. Snyder, Mobile Telecommunications Networking with IS-41, copyright 1997; McGraw-Hill; Cover page; 1 sheet; Chapter 11, pp. 183-223.

*Primary Examiner* — Dede Zecher
*Assistant Examiner* — Viral Lakhia

(57) ABSTRACT

Examples disclosed herein include methods, systems, and devices to help a UE to securely output a copy of a security key stored on the UE. According to examples, a UE receives a test security key from a provider. Based on the received test security key, the UE computes a test result, and then the UE transmits the computed test result to a network authentication system. The UE receives from the network authentication system a response indicating a match between the computed test result and a test result computed by the network authentication system. Based on the received response indicating the match, the UE outputs a copy of the security key stored in the UE to the provider.

18 Claims, 4 Drawing Sheets

(56) References Cited

U.S. PATENT DOCUMENTS

| | | | |
|---|---|---|---|
| 2012/0240204 A1* | 9/2012 | Bhatnagar | G06F 21/35 726/5 |
| 2013/0282589 A1* | 10/2013 | Shoup | G06F 21/34 705/67 |
| 2014/0040147 A1* | 2/2014 | Varadarajan | H04L 63/0853 705/71 |
| 2014/0068765 A1* | 3/2014 | Choi | H04L 9/0852 726/23 |
| 2014/0281554 A1* | 9/2014 | Maletsky | H04L 9/14 713/175 |
| 2016/0189147 A1* | 6/2016 | Vanczak | G06Q 20/32 705/71 |

* cited by examiner

SECURELY OUTPUTTING A SECURITY KEY STORED IN A UE

BACKGROUND

Unless otherwise indicated herein, the description provided in this section is not itself prior art to the claims and is not admitted to be prior art by inclusion in this section.

A typical cellular network includes one or more serving systems that provide cellular service to user equipment devices (UEs), such as cell phones, tablet computers, tracking devices, embedded wireless modules, and other wirelessly equipped communication devices. At some point in time, a UE may request access to a serving system. For instance, the UE may seek to register with the serving system. The serving system may then communicate with the UE and a network authentication system in an attempt to authenticate the UE.

The authentication process may involve the serving system providing to the UE a random number that is known by the network authentication system and the UE using the random number and a security key that is stored in the UE to compute an authentication result. The UE may then transmit the computed authentication result to the serving system, which in turn may provide the authentication result to the network authentication system. Further, simultaneously or sequentially, the network authentication system may carry out the same computations as the UE using the same random number as the UE but using a security key that is stored in a network profile record for the UE.

The network authentication system may then compare its computed authentication result with the authentication result computed by the UE. At this point, assuming all other data used in the computations was correct, the authentication process should succeed if the network authentication system and UE both used the same security key in their respective computations. In particular, if they both used the same security key, then the results of their computations should match, which the network authentication system would deem to represent successful authentication. Whereas, if they did not use the same security key, then the results of their computations would not match, which the network authentication system would deem to represent failed authentication. In the event authentication is successful, the serving system may then perform normal system access processing and thereby provide the UE access to the cellular network.

OVERVIEW

Successful authentication of a UE is typically required before the UE can access a cellular network. While the aforementioned authentication process is generally effective, certain problems do exist. For example, the network authentication system might at times store the wrong security key in a network profile record for a UE. Consequently, any subsequent authentication attempts would fail because the UE and network authentication system would perform their respective computations using different security keys.

The examples disclosed herein help address this issue. In accordance with the disclosure, an entity may attempt to obtain a copy of the security key stored in the UE. For instance, the entity may do so to provide the network authentication system a copy of the correct security key for the UE, which may facilitate successfully authenticating the UE in the future. Before the UE outputs the security key stored in the UE, the UE and network authentication system may perform a validation process to determine the legitimacy of the entity requesting the copy of the security key stored in the UE. If validation is successful, the UE may output to the entity a copy of the security key stored in the UE.

In practice, the validation process involves a UE receiving a test security key from a provider. The provider may be a network authentication system, a computing system of a service provider, or perhaps a technician or the like of a service provider.

According to examples herein, it is assumed that the network authentication system is a trusted entity. This assumption is so even if the network authentication system has stored an incorrect security key in a network profile record for a given UE. Moreover, it is assumed that entities that have access to network profile records stored by the network authentication system are also trusted.

Accordingly, a legitimate provider is a provider that has access to the security key stored in the network profile record for the UE. The legitimate provider provides to the UE this security key as the test security key. On the other hand, an illegitimate provider does not have access to the network profile record of the UE and provides as the test security key a security key that is different from the security key that is stored in the network profile record. As discussed below, a test security key provided by an illegitimate provider causes the validation process to fail.

The validation process continues with the UE using the received test security key to perform computations in line with the above authentication discussion and then transmitting a computed test result to the network authentication system. Simultaneously or sequentially, the network authentication system also performs computations in line with the above discussion but uses as its test security key the security key stored in the network profile record for the UE. In the event the provider is legitimate, the network authentication system and UE use the same security key in their respective test computations.

Thereafter, the network authentication system compares its computed test result with the computed test result received from the UE. If the comparison results in a match, a reasonable conclusion is that the provider of the test security key is a legitimate provider (e.g., because only a legitimate provider would have access to the network profile record of the UE), and the network authentication system would deem the match to represent successful validation. On the other hand, if the comparison does not result in a match, a reasonable conclusion is that the provider of the test security key is illegitimate, and the network authentication system would deem this to represent failed validation.

In the event that validation is successful, the network authentication system transmits to the UE a response indicating the match. The UE then outputs to the provider a copy of the security key stored in the UE. In this way, the UE securely outputs to the provider a copy of the security key stored in the UE only when the provider of the test security key has been successfully validated.

The UE outputting the copy of the security key stored in the UE may facilitate storing this copy in the network profile record for the UE. For example, after the provider receives from the UE the copy of the security key, the provider may provide this copy to the network authentication system. The network authentication system may then store this copy of the security key in the network profile record for the UE. In the event that the network authentication system had previously stored a different security key in the network profile record for the UE, the network profile record would now contain the correct security key for the UE. This in turn may facilitate authenticating the UE according to the process discussed above and thereby provide the UE access to the cellular network.

Accordingly, in one respect, disclosed herein is a method operable by a UE to securely output a copy of a security key stored in the UE. The method involves the UE receiving a test security key from a provider. Further, the method involves, based on the received test security key, the UE computing a test result and the UE transmitting the computed test result to a network authentication system. The method also involves the UE receiving from the network authentication system a response indicating a match between the computed test result and a test result computed by the network authentication system. The method then involves, based on the received response indicating the match, the UE outputting to the provider a copy of the security key stored in the UE.

Also disclosed herein is a UE that includes a wireless communication interface, a non-transitory computer-readable medium, and program instructions stored in the non-transitory computer-readable medium and executable by at least one processor to cause the UE to perform operations such as those disclosed herein.

In another respect, disclosed herein is a method operable by a network authentication system to validate a source that provides a test security key to a UE. The method involves the network authentication system receiving from the UE a first test result computed by the UE based on the test security key. The method further involves the network authentication system computing a second test result based on a security key stored, by the network authentication system, in a network profile record for the UE. The method also involves the network authentication system determining a match between the received first test result and the computed second test result. The method then involves, based on determining the match, the network authentication system transmitting to the UE a response indicating the match and thereby validating the source of the test security key provided to the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
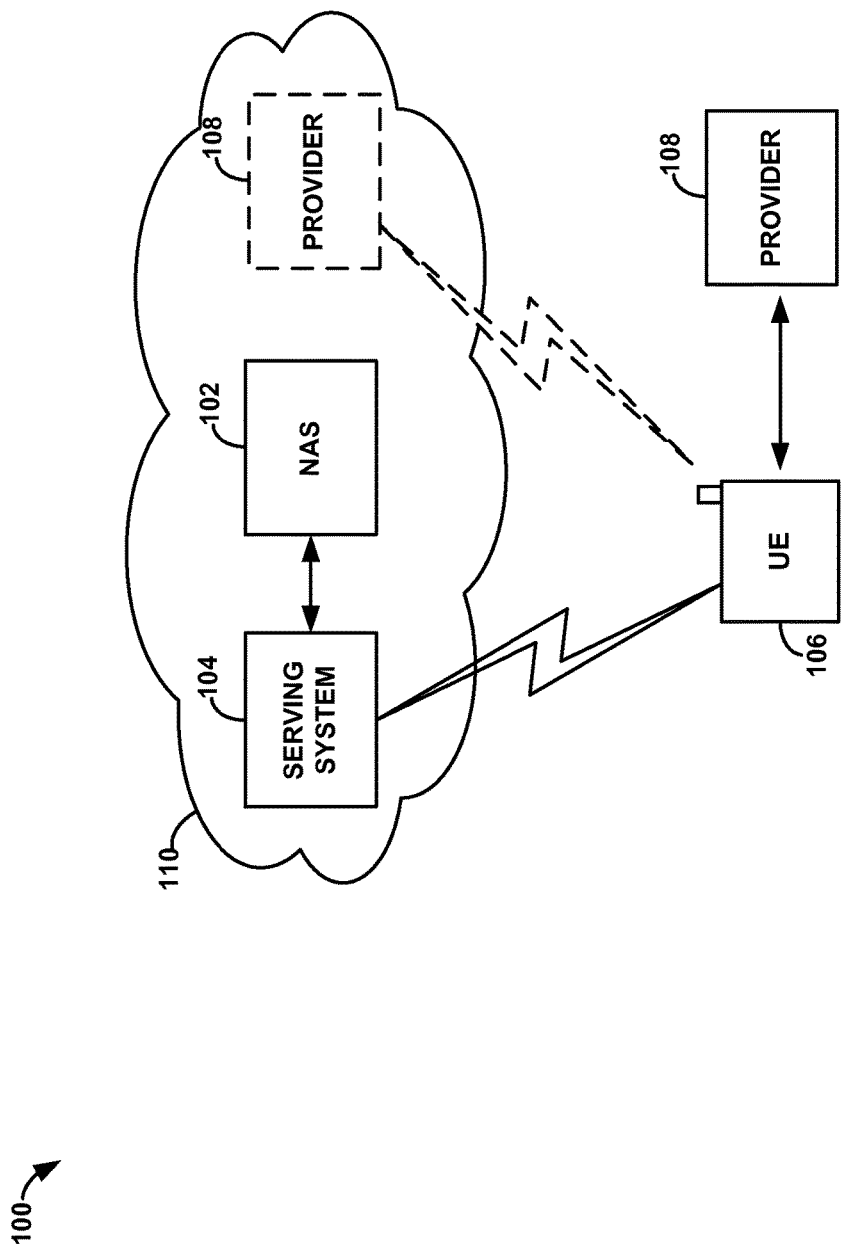
FIG. 1 is a simplified block diagram of a network arrangement in which example embodiments may be implemented.

As discussed above, a UE and network authentication system may perform an authentication process before the UE may access a cellular network. For purposes of example and explanation, an authentication process according to the IS-41 standard is discussed below. However, it should be understood that this is but one example of an authentication process and other authentication process are certainly possible and contemplated herein.

As noted above, FIG. 1 is a simplified block diagram of a network arrangement 100 in which example embodiments may be implemented. It should be understood, however, that this and other arrangements and processes described herein are set forth for purposes of example only and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The network arrangement 100 may include a network authentication system 102, a serving system 104, a UE 106, and a provider 108. The network authentication system 102 and the serving system 104 may be part of a wireless communication network 110, such as a cellular network. In some examples, the provider 108 may be part of the cellular network 110, while in other examples, the provider 108 may be independent from the cellular network 110.

The network authentication system 102 may be communicatively coupled to the serving system 104, which in turn may be communicatively coupled to the UE 106 using over-the-air signaling for instance. Depending on the implementation, the UE 106 may be in communication with the provider 108 in a number of manners. In one example, the UE 106 may be in communication with the provider 108 using a wireless communication standard. In other examples, the UE 106 may be in communication with the provider 108 using one or more input interfaces on the UE 106.

In practice, the network authentication system 102 may include one or more servers or other networked computing devices configured to perform various operations described herein. In examples, the network authentication system 102 may be operated by a wireless service provider and may include an authentication center (AC) and a home location register (HLR), among other elements. In some examples, an AC and HLR may be discrete components, while in other examples, an AC and HLR may be part of the same entity.

An AC may take the form of one or more servers or other computing devices configured to perform various operations described herein. In particular, the AC may include one or more communication interfaces, one or more processing units, and data storage, all of which may be communicatively linked together by a system bus or other connection mechanism.

The one or more communication interfaces may facilitate signaling between the AC and other network components, such as an HLR and the serving system 104. Each processing unit may include one or more general purpose processors (e.g., microprocessors) and/or one or more special purpose processors (e.g., application specific integrated circuits) and may be integrated in whole or in part with the one or more communication interfaces. The data storage may include at least one non-transitory computer-readable medium, such as optical, magnetic, or flash memory, and may be integrated in whole or in part with the one or more processing units. Moreover, the data storage may include program instructions, which may be executable by the one or more processing units to carry out various operations described herein.

An HLR may take the form of a database configured to store information related to UEs serviced by the wireless service provider. Such information may include mobile identification numbers (MINs), electronic serial numbers (ESNs), and security keys (e.g., authentication keys (A-keys)), among other information. For each serviced UE, the HLR may maintain such information in a respective network profile record. In practice, when a UE is first activated by a wireless service provider, an AC affiliated with the wireless service provider may securely store the above-mentioned information in a network profile record for the UE. The AC may be configured to access the network profile records stored by the HLR and to utilize the information to carry out authentication procedures. Moreover, the AC may be configured to utilize the serving system 104 to communicate with the UE 106.

The serving system 104 may include a mobile switching center (MSC), a visitor location register (VLR), and a base station, among other elements. The VLR may take the form of a database configured to store temporary information related to UEs currently or recently within the coverage area of the base station. Such information may include respective locations of UEs and wireless service information, among other information. The MSC may be configured to access information from the VLR to facilitate establishing calls to and from the UE 106, among other operations. The MSC may also be configured to control operations of the base station.

The base station may be configured to radiate wireless signals to define wireless coverage areas, such as cells or cell sectors, in which UEs may operate. The base station may be coupled with network infrastructure that provides connectivity with one or more transport networks, such as the public switched telephone network (PSTN) and/or the Internet for instance. With this arrangement, the UE 106 within coverage of the base station may access the cellular network 110 by engaging in air interface communication with the base station and may thereby communicate via the base station with various remote network entities or with other UEs.

The UE 106 may be configured to communicate with the serving system 104 to obtain access to the cellular network 110. The UE 106 may also be configured to store a security key, such as an A-key, that may be used during an authentication process. In practice, the security key may be permanently stored in a secure element of the UE 106 and may be unchangeable. As noted above, the UE 106 may take the form of a cell phone, tablet computer, tracking device, embedded wireless module, or other wirelessly equipped communication device. As such, the UE 106 may include one or more input interfaces, among other components. The internal components of the UE 106 are discussed in further detail below.

The provider 108 may take various forms. In one example, the provider 108 may take the form of the network authentication system 102 or a computing system of a service provider, such as the wireless service provider that operates the serving system 104. In such examples, the provider 108 may be part of the cellular network 110 and may be configured to communicate with the UE 106 (perhaps through the serving system 104) using over-the-air signaling, such as in accordance with WAP Push or the like.

In another example, the provider 108 may take the form of a computing device configured to interface with the UE 106. In such examples, the provider 108 may be configured to communicate with the UE 106 via a wired or wireless communication technology, such as Bluetooth or Wifi, among other examples. In yet another example, the provider 108 may take the form of a user, such as a technician employed by the wireless service provider. In such examples, the provider 108 may communicate with the UE 106 via one or more input interfaces on the UE 106.

As discussed above, before the UE 106 has access to the cellular network 110, the UE 106 may first undergo authentication procedures. In some cases, the AC of the network authentication system 102 may be configured to carry out each step of the authentication procedures, and thus, the network authentication system 102 may not include the serving system 104. In other cases, the serving system 104 may be configured to perform some authentication operations, and thus, the network authentication system 102 may include the AC and serving system 104. For sake of simplicity, the following will generally discuss the network authentication system 102 performing the authentication procedures.

At some point in time, the UE 106 may request access to the serving system 104. For instance, the UE 106 may seek to register with the serving system 104 or perhaps originate or terminate a call. Based on this request, the serving system 104 and the UE 106 may perform an authentication process.

The serving system 104 may be configured to initiate the authentication process by communicating with the UE 106 using over-the-signaling. In particular, the serving system 104 may be configured to provide a numeric authentication challenge to the UE 106 over a particular radio control channel, as well as to any other UEs using the particular control channel. The numeric authentication challenge may include a random number for use in the authentication process.

After receiving the authentication challenge, the UE 106 may be configured to compute an authentication result. In particular, the UE 106 may be configured to first generate shared secret data (SSD) from a calculation that uses the A-key stored in the UE 106, an ESN unique to the UE 106, and the random number from the authentication challenge. The UE 106 may be configured to then use the SSD to execute a set of algorithms, which are collectively known as the cellular authentication and voice encryption (CAVE) algorithm. The UE 106 may also be configured to transmit to the network authentication system 102 via the serving system 104 an authentication result from the executed CAVE algorithm.

Simultaneously or sequentially, the network authentication system 102 may be configured to perform similar authentication operations as the UE 106. However, the network authentication system 102 may be configured to generate SSD using an A-key from the network profile record of the UE 106. The network authentication system 102 may be configured to compute its own authentication result based on this generated SSD.

The network authentication system 102 may also be configured to compare its computed authentication result with the authentication result computed by the UE 106. At this point, assuming all other data used in the computations was correct, the authentication process should succeed if the network authentication system 102 and UE 106 both used the same A-key in their respective computations. In line with the above discussion, their computations should match if they both used the same A-key, whereas their computations will not match if they used different A-keys. In the event there is a match, the network authentication system 102 would deem that to represent successful authentication. The serving system 104 may then perform normal system access processing and thereby provide the UE 106 access to the cellular network 110.

As discussed above, some problems exist with the aforementioned authentication process. For example, authentication will fail if the network authentication system 102 stores an incorrect A-key in the network profile record of the UE 106. To address this problem, a legitimate entity may attempt to obtain a copy of the security key stored in the UE 106 to facilitate updating the incorrect A-key stored in the network profile record of the UE 106. However, an illegitimate entity could also attempt to obtain a copy of the security key stored in the UE 106 for illegitimate purposes, such as to utilize the credentials of the UE 106 to illegally access the cellular network 110. Accordingly, before the UE 106 outputs a copy of its A-key, the UE 106 and the network authentication system 102 may perform a validation process to determine the legitimacy of the entity requesting the copy of the A-key stored in the UE 106. The UE 106 will output a copy of its A-key only if validation is successful.

In practice, the validation process may involve the UE 106 receiving a test security key, such as a test A-key, from the provider 108. In examples where the provider 108 is a legitimate provider, the test security key may be the A-key that is stored in the network profile record of the UE 106. Whereas, in examples where the provider 108 is an illegitimate provider, the test security key may be an A-key different from that which is stored in the network profile record of the UE 106.

In any event, the UE 106 may be configured to receive the test A-key through over-the-air signaling or perhaps via a wired communication interface. Additionally or alternatively, the UE 106 may be configured to detect at an input interface one or more inputs indicating the test A-key. As noted above, in some examples, the network authentication system 102 may be or include the provider 108 and thus may be configured to transmit the test A-key to the UE 106.

Based on the received test A-key, the UE may be configured to compute a test result. In particular, after the UE 106 receives the test A-key, the UE 106 may perform operations in line with the above-discussed authentication process but the UE 106 may utilize the test A-key instead of the A-key permanently stored in the UE 106. For instance, the UE 106 may be configured to determine test SSD based on the test A-key and to execute the CAVE algorithm based on the test SSD. The UE 106 may be configured to then transmit a computed test result to the network authentication system 102.

The network authentication system 102 may be configured to receive from the UE 106 the computed test result. Moreover, the network authentication system 102 may be configured to perform similar validation operations as the UE 106, but the network authentication system 102 may utilize as its test A-key the A-key stored in the network profile record for the UE 106. In some examples, the network authentication system 102 may be configured to carry out its validation operations simultaneous to, or perhaps before, the UE 106 performs its operations. In other examples, the network authentication system 102 may be configured to carry out its validation operations based on receipt of the computed test result from the UE 106.

Thereafter, the network authentication system 102 may be configured to compare its computed test result with the computed test result received from the UE 106. As discussed above, it is assumed that only trusted entities have access to the network profile record of the UE 106. As such, only if the provider 108 is a legitimate provider would the provider 108 provide to the UE 106 a copy of the A-key that is stored in the network profile record of the UE 106. In such a scenario, the UE 106 and the network authentication system 102 would compute equivalent test results, and the network authentication system 102 would determine a match between the test results. The network authentication system 102 may be configured to deem such a match as representing a successful validation.

On the other hand, if the provider 108 is an illegitimate provider, then the provider 108 would provide to the UE 106 a different A-key than that which is stored in the network profile record of the UE 106. In such a scenario, the UE 106 and the network authentication system 102 would compute different test results, and the network authentication system 102 would determine that the test results do not match. The network authentication system 102 may be configured to deem a mismatch to represent a failed validation.

In the event that validation fails, the network authentication system 102 may be configured to transmit to the UE 106 a response indicating the mismatch and thereby notifying the UE 106 that the provider 108 is not a legitimate entity. Based on such a received response, the UE 106 may be configured to forgo communicating with the provider 108. That is, based on the received response, the UE 106 may be configured to not output to the provider 108 a copy of the A-key stored in the UE 106.

In the event that validation is successful, the network authentication system 102 may be configured to transmit to the UE 106 a response indicating the match and thereby validate the source (e.g., the provider 108) of the test A-key provided to the UE 106. The UE 106 may receive the response indicating the match between the computed test results, and based on the received response, the UE 106 may be configured to output to the provider 108 a copy of the A-key stored in the UE 106. In this way, the UE 106 may be configured to securely output a copy of the A-key stored in the UE 106 only when the source of the test A-key has been successfully validated.

The UE 106 outputting the copy of the A-key stored in the UE 106 may facilitate storing this copy in the network profile record for the UE 106. For instance, after the network authentication system 102 transmits the response indicating the match, the network authentication system 102 may receive a copy of the A-key stored in the UE 106. In some examples, after the provider 108 receives from the UE 106 the copy of the A-key, the provider 108 may provide this copy to the network authentication system 102. In other examples where the network authentication system 102 is or includes the provider 108, the UE 106 may be configured to provide a copy of the A-key to the network authentication system 102 via the serving system 104 for instance.

In any event, after receiving the copy of the A-key, the network authentication system 102 may be configured to replace the current A-key stored in the network profile record of the UE 106 with the received copy of the A-key. In the event that the network authentication system 102 had previously stored a different A-key in the network profile record for the UE 106, the network profile record would now contain the correct A-key for the UE 106. This in turn may facilitate successful authentication of the UE 106 according to the process discussed above and thereby provide the UE 106 access to the wireless communication network 110.

Figure 2:
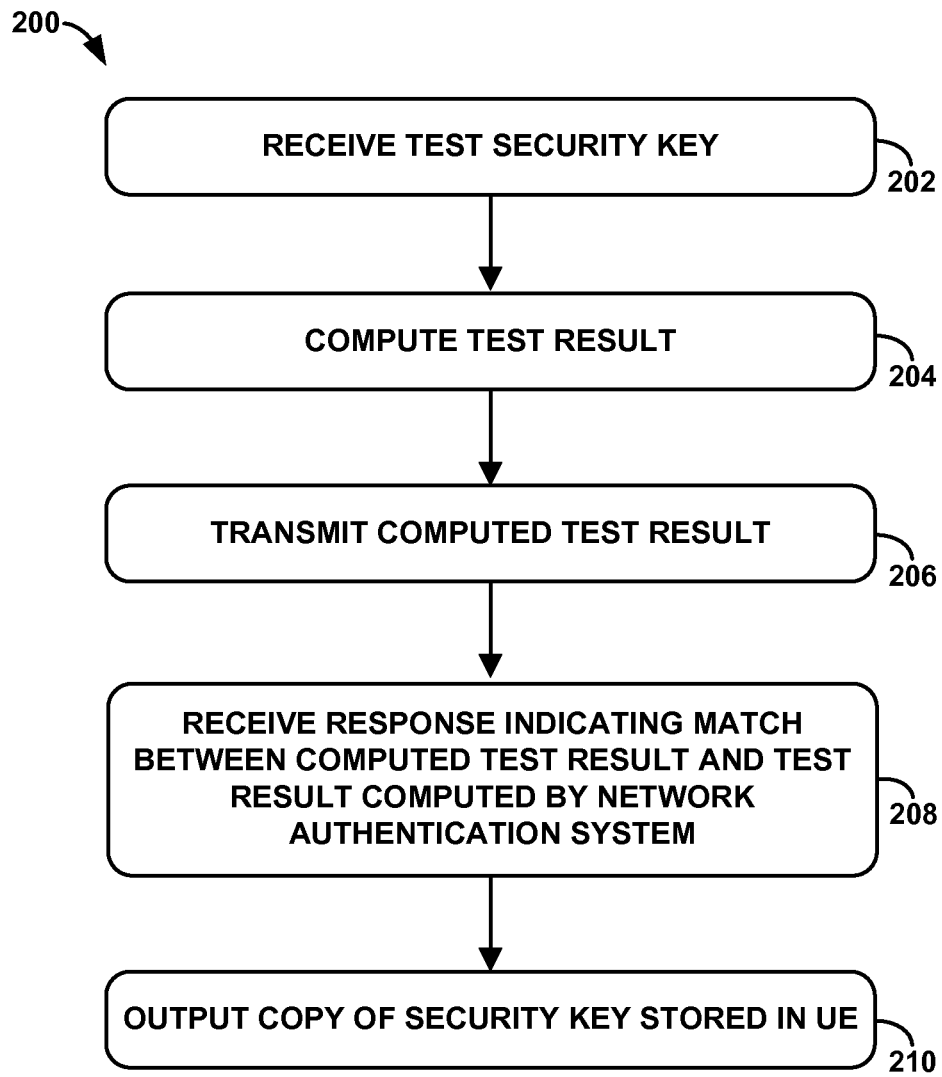
FIG. 2 is a flow chart illustrating operations that may be carried out in accordance with an example method.

Turning now to FIG. 2, a flow chart is shown to illustrate operations that may be carried out in accordance with an example method 200, in a network arrangement such as that depicted in FIG. 1. The method 200 may be operable by a computing device, such as the UE 106, and may include operations identified by blocks 202-210 that may be performed in line with the above discussion to securely output a copy of a security key stored in the UE 106.

As shown in FIG. 2, at block 202, the method 200 involves the UE 106 receiving from the provider 108 a test security key, such as a test A-key. At block 204, the method 200 involves, based on the received test security key, the UE 106 computing a test result. At block 206, the method 200 involves the UE 106 transmitting to the network authentication system 102 the computed test result. At block 208, the method 200 involves the UE 106 receiving from the network authentication system 102 a response indicating a match between the computed test result and a test result computed by the network authentication system 102. At block 208, the method 200 involves, based on the received response indicating the match, the UE 106 outputting to the provider 108 a copy of the security key stored in the UE 106.

Figure 3:
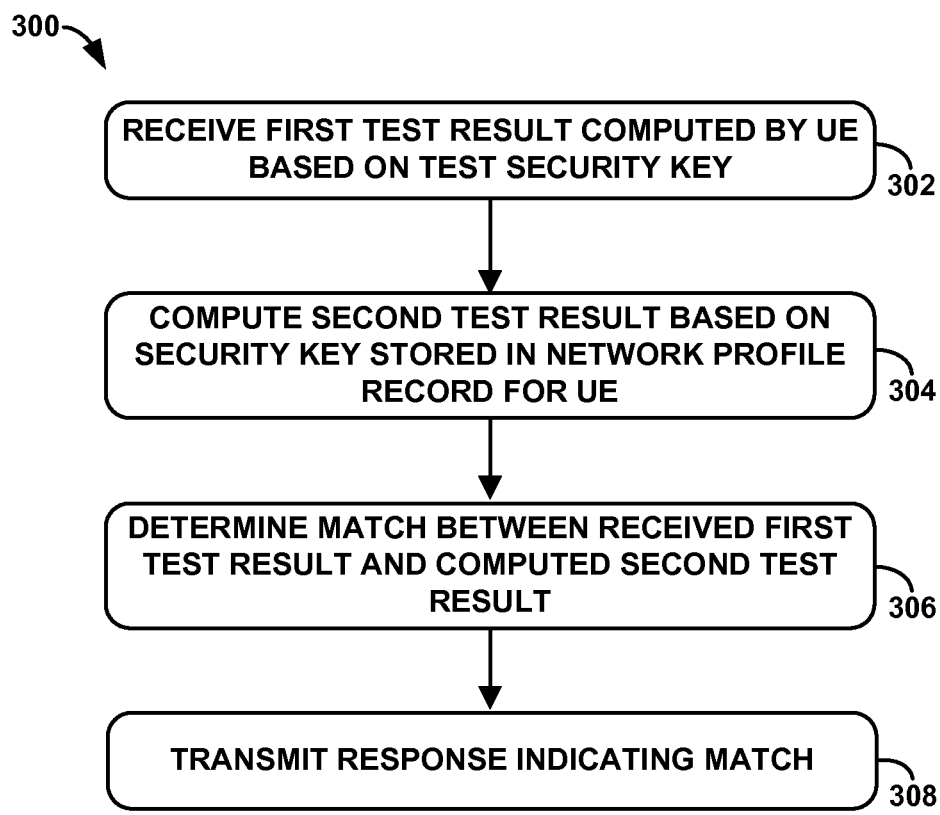
FIG. 3 is another flow chart illustrating operations that may be carried out in accordance with an example method.

Turning now to FIG. 3, a flow chart is shown to illustrate operations that may be carried out in accordance with an example method 300, in a network arrangement such as that depicted in FIG. 1. The method 300 may be operable by a computing system, such as the network authentication system 102. In particular, the method 300 may be operable by the AC of the network authentication system 102. The method 300 may include operations identified by blocks 302-308 that may be performed in line with the above discussion to validate a source, such as the provider 108, that provides a test security key to a UE.

As shown in FIG. 3, at block 302, the method 300 involves the network authentication system 102 receiving from the UE 106 a first test result computed by the UE 106 based on the test security key. At block 304, the method 300 involves the network authentication system 102 computing a second test result based on a security key stored, by the network authentication system, in a network profile record of the UE 106. At block 306, the method 300 involves the network authentication system 102 determining a match between the received first test result and the computed second test result. At block 308, the method 300 involves, based on determining the match, the network authentication system 102 transmitting to the UE 106 a response indicating the match and thereby validating the source of the test security key provided to the UE 106.

Figure 4:
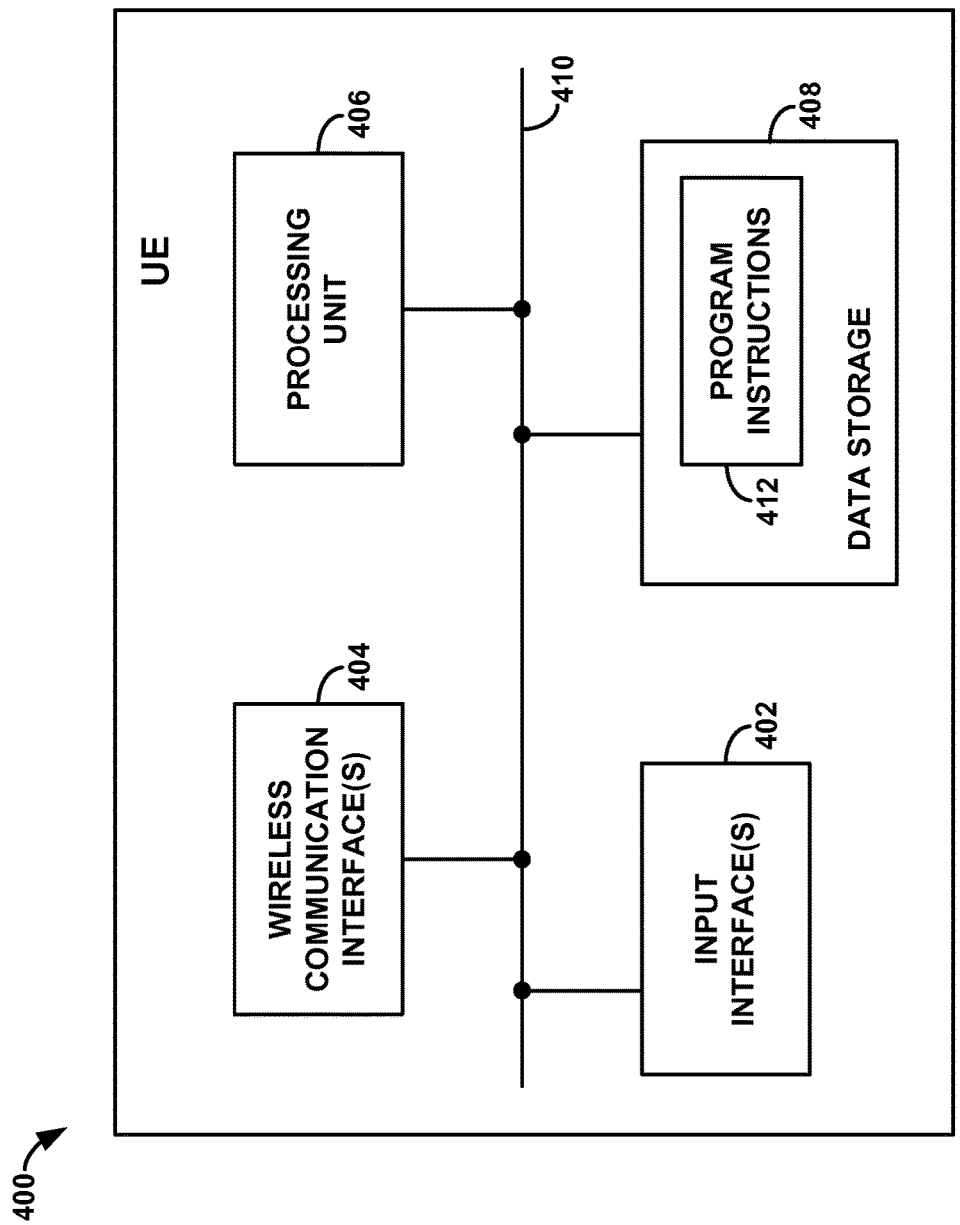
FIG. 4 is a simplified block diagram of an example UE operable in a network arrangement such as that depicted in FIG. 1.

Turning now to FIG. 4, a simplified block diagram of a UE 400 is shown with some of the physical components that such a device may include. As shown in FIG. 4, the UE 400 may include one or more input interfaces 402, one or more wireless communication interfaces 404, a processing unit 406, and data storage 408, all of which may be communicatively linked together by a system bus, network, or other connection mechanism 410. It should be understood that the UE 400 may include additional components as well.

The one or more input interfaces 402 may generally be configured to facilitate user interaction with the UE 400 and may thus include or provide connectivity to various components that facilitate such user interaction. For instance, the one or more input interfaces 402 may include or provide connectivity to input components, examples of which include a touch-sensitive screen or pad, a navigation pad, a multi-purpose button, a thumb wheel, a keyboard or keypad, a microphone, etc. Additionally, the one or more input interfaces 402 may include or provide connectivity to output components, examples of which include a display screen, a speaker, a headset jack, etc. Other configurations are possible as well.

The one or more wireless communication interfaces 404 may be configured to provide for communication with various other network elements and may thus take various forms, allowing for wireless communication for instance. In particular, a wireless communication interface 404 may include an antenna structure that may be configured to transmit and/or receive various signals and perform various other functions as discussed above. For instance, the wireless communication interface 404 may at times receive from a provider over-the-air signaling indicating a test security key. In examples, the UE 400 may include multiple wireless communication interfaces and each may be configured according to a given wireless communication technology, such as WiFi, Bluetooth, LTE, CDMA, WiMAX, and the like.

The processing unit 406 may include one or more general purpose processors (e.g., microprocessors) and/or one or more special purpose processors (e.g., application specific integrated circuits) and may be integrated in whole or in part with the one or more wireless communication interfaces 404. The data storage 408 may include at least one non-transitory computer-readable medium, such as optical, magnetic, or flash memory, and may be integrated in whole or in part with the processing unit 406. As shown, by way of example, the data storage 408 may include program instructions 412, which may be executable by the processing unit 406 to carry out various operations described herein. The data storage 408, or perhaps another component of the UE 400, may also store a security key, such as an A-key, that may be utilized by the UE 400 to perform the authentication and/or validation operations discussed above. In examples, the UE 400 may store the security key such that the security key is permanent and unchangeable. Other examples are possible as well.

Exemplary embodiments have been described above. Those skilled in the art will understand, however, that changes and modifications may be made to these embodiments without departing from the true scope and spirit of the invention.

We claim:

1. In a wireless communication system in which a user equipment device (UE) permanently stores an A-key and in which a trusted network authentication system (NAS) should store the same A-key in a profile record for the UE so that when the NAS seeks to authenticate the UE, both the UE and the NAS would generate a same authentication result as each other based on that A-key, a method for the UE to securely output a copy of its permanently stored A-key to facilitate provisioning the profile record with that A-key, so as to enable the NAS to subsequently authenticate the UE based on that A-key, the method comprising:

receiving by the UE from an entity a test A-key, wherein (i) if the entity is a trusted entity having access to the profile record for the UE, then the received test A-key is a copy of an A-key stored in the profile record for the UE and (ii) if the entity is not a trusted entity having access to the profile record for the UE, then the received test A-key is not a copy of the A-key stored in the profile record for the UE;

using by the UE the received test A-key to engage in test authentication with the NAS, wherein (i) if the received test A-key is a copy of the A-key stored in the profile record for the UE, then the test authentication would be successful and would thereby establish that the entity is trusted, and (ii) if the received test A-key is not a copy of the A-key stored in the profile record for the UE, then the test authentication would fail and would thereby establish that the entity is not trusted; and responsive to at least the test authentication being successful, outputting by the UE to the entity a copy of the A-key stored permanently in the UE, to facilitate storing in the profile record for the UE the same A-key that is permanently stored in the UE so as to enable the NAS to engage in subsequent authentication of the UE.

2. The method of claim 1, wherein the NAS comprises at least one of an authentication center or a serving system that provides service to the UE.

3. The method of claim 1, wherein receiving by the UE from the entity the test A-key comprises receiving the test A-key through over-the-air signaling.

4. The method of claim 1, wherein receiving by the UE from the entity the test A-key comprises detecting by the UE, at one or more input interfaces of the UE, one or more inputs indicating the test A-key.

5. The method of claim 1, wherein engaging by the UE in test authentication with the NAS comprises:
computing by the UE a test shared secret data (SSD) based on the received test A-key;
using by the UE the computed test SSD to establish a test authentication result;
transmitting by the UE the test authentication result to the NAS; and
receiving from the NAS a response indicative of whether the test authentication result matches an authentication result established by the NAS based on the A-key stored in the profile record for the UE.

6. The method of claim 1, wherein the subsequent authentication of the UE is for providing the UE with access to a communication network.

7. A user equipment device (UE) comprising:
a wireless communication interface;
a processing unit; and
data storage,
wherein the UE permanently stores an A-key, whereby a trusted network authentication system (NAS) should store the same A-key in a profile record for the UE so that when the NAS seeks to authenticate the UE, both the UE and the NAS would generate a same authentication result as each other based on that A-key, and
wherein the UE further comprises program instructions stored in the data storage and executable by the processing unit to cause the UE to securely output a copy of the permanently stored A-key, to facilitate provisioning the profile record with that A-key, wherein the instructions cause the UE to carry out operations comprising:
receiving from an entity a test A-key, wherein (i) if the entity is a trusted entity having access to the profile record, then the received test A-key is a copy of an A-key stored in the profile record, and (ii) if the entity is not a trusted entity having access to the profile record, then the received test A-key is not a copy of the A-key stored in the profile record,
using the received test A-key to engage in test authentication with the NAS, wherein (i) if the received test A-key is a copy of the A-key stored in the profile record, then the test authentication would be successful and would thereby establish that the entity is trusted, and (ii) if the received test A-key is not a copy of the A-key stored in the profile record, then the test authentication would fail and would thereby establish that the entity is not trusted, and
responsive to at least the test authentication being successful, outputting to the entity a copy of the A-key stored permanently in the UE, to facilitate storing in the profile record the same A-key that is permanently stored in the UE so as to enable the NAS to engage in subsequent authentication of the UE.

8. The UE of claim 7, whereby the NAS comprises at least one of an authentication center or a serving system that provides service to the UE.

9. The UE of claim 7, wherein receiving by the UE from the entity the test A-key comprises receiving the test A-key through over-the-air signaling.

10. The UE of claim 7, further comprising an input interface, wherein receiving by the UE from the entity the test A-key comprises detecting by the UE, at the one or more input interfaces, one or more inputs indicating the test A-key.

11. The UE of claim 7, wherein engaging by the UE in test authentication with the NAS comprises:
computing by the UE a test shared secret data (SSD) based on the received test A-key;
using by the UE the computed test SSD to establish a test authentication result;
transmitting by the UE the test authentication result to the NAS; and
receiving from the NAS a response indicative of whether the test authentication result matches an authentication result established by the NAS based on the A-key stored in the profile record.

12. The UE of claim 7, wherein the subsequent authentication of the UE is for providing the UE with access to a communication network.

13. In a wireless communication system in which a user equipment device (UE) permanently stores an A-key and in which a trusted network authentication system (NAS) should store the same A-key in a profile record for the UE so that when the NAS seeks to authenticate the UE, both the UE and the NAS would generate a same authentication result as each other based on that A-key, a method for the UE to securely output a copy of its permanently stored A-key to facilitate provisioning the profile record with that A-key, so as to enable the NAS to subsequently authenticate the UE based on that A-key, the method comprising:
receiving by the UE from an entity a test A-key, wherein (i) if the entity is a trusted entity having access to the profile record for the UE, then the received test A-key is a copy of an A-key stored in the profile record for the UE and (ii) if the entity is not a trusted entity having access to the profile record for the UE, then the received test A-key is not a copy of the A-key stored in the profile record for the UE;
using by the UE the received test A-key to engage in test authentication with the NAS, wherein (i) if the received test A-key is a copy of the A-key stored in the profile record for the UE, then the test authentication would be successful and would thereby establish that the entity is trusted, and (ii) if the received test A-key is not a copy of the A-key stored in the profile record for the UE, then the test authentication would fail and would thereby establish that the entity is not trusted;
receiving by the UE from the NAS a response indicating whether or not the test authentication is successful;
if the response indicates that the test authentication is not successful, then the UE not outputting to the entity a copy of the A-key stored permanently in the UE; and
if the response indicates that the test authentication is successful, then outputting by the UE to the entity a copy of the A-key stored permanently in the UE, to facilitate storing in the profile record for the UE the same A-key that is permanently stored in the UE so as to enable the NAS to engage in subsequent authentication of the UE.

14. The method of claim 13, wherein the NAS comprises at least one of an authentication center or a serving system that provides service to the UE.

15. The method of claim 13, wherein receiving by the UE from the entity the test A-key comprises receiving the test A-key through over-the-air signaling.

16. The method of claim 13, wherein receiving by the UE from the entity the test A-key comprises detecting by the UE, at one or more input interfaces of the UE, one or more inputs indicating the test A-key.

17. The method of claim 13, wherein engaging by the UE in test authentication with the NAS comprises:
- computing by the UE a test shared secret data (SSD) based on the received test A-key;
- using by the UE the computed test SSD to establish a test authentication result;
- transmitting by the UE the test authentication result to the NAS; and
- receiving from the NAS a response indicative of whether the test authentication result matches an authentication result established by the NAS based on the A-key stored in the profile record for the UE.

18. The method of claim 13, wherein the subsequent authentication of the UE is for providing the UE with access to a communication network.

* * * * *